(12) United States Patent
Choi (10) Patent No.: US 9,394,823 B2
(45) Date of Patent: Jul. 19, 2016

(54) O2 PURGE CONTROL METHOD AND VEHICLE EXHAUST SYSTEM FOR TWO TYPE CATALYSTS

(71) Applicant: Hyundai Motor Company, Seoul (KR)

(72) Inventor: Muyoung Choi, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 17 days.

(21) Appl. No.: 14/463,261

(22) Filed: Aug. 19, 2014

(65) Prior Publication Data

US 2015/0101312 A1 Apr. 16, 2015

(30) Foreign Application Priority Data

Oct. 11, 2013 (KR) .................... 10-2013-0121150

(51) Int. Cl.
*F01N 3/00* (2006.01)
*F01N 9/00* (2006.01)
*F01N 11/00* (2006.01)
*F01N 13/00* (2010.01)

(52) U.S. Cl.
CPC *F01N 9/007* (2013.01); *F01N 9/00* (2013.01); *F01N 11/007* (2013.01); *F01N 13/009* (2014.06); *F01N 2560/025* (2013.01); *F01N 2560/14* (2013.01); *F01N 2570/14* (2013.01); *F01N 2900/0416* (2013.01); *F01N 2900/08* (2013.01); *F01N 2900/1624* (2013.01); *Y02T 10/47* (2013.01)

(58) Field of Classification Search
USPC ............. 60/274, 276, 277, 284, 286
See application file for complete search history.

(56) References Cited

U.S. PATENT DOCUMENTS

| 5,509,267 A * | 4/1996 | Theis ................... F01N 11/007 60/274 |
| 6,622,478 B2 * | 9/2003 | Nakamura ............ F01N 3/0814 60/276 |
| 6,988,359 B2 * | 1/2006 | Ide ......................... F01N 3/101 60/274 |
| 7,117,665 B2 * | 10/2006 | Kamoto .................. F01N 3/101 60/274 |
| 7,198,952 B2 * | 4/2007 | Uchida .............. B01D 53/9495 422/108 |
| 7,200,988 B2 * | 4/2007 | Yamashita ............ F01N 3/101 60/274 |
| 8,151,552 B2 * | 4/2012 | Iida ....................... F01N 3/0814 60/274 |
| 2003/0136113 A1 | 7/2003 | Nakagawa et al. |

FOREIGN PATENT DOCUMENTS

| JP | 2001-323812 A | 11/2001 |
| JP | 2006-022779 A | 1/2006 |
| JP | 2010-19138 A | 1/2010 |
| KR | 10-0444376 B1 | 8/2004 |
| KR | 10-0774718 B1 | 11/2007 |
| KR | 10-2009-0060798 A | 6/2009 |
| KR | 10-104129 B1 | 7/2011 |
| WO | WO 2006/123595 A1 | 11/2006 |

* cited by examiner

*Primary Examiner* — Binh Q Tran
(74) *Attorney, Agent, or Firm* — Morgan, Lewis & Bockius LLP (57) ABSTRACT

An O2 purge control method for two type catalysts may include, performing, by a WCC O2 purge of a warm up catalytic converter (WCC), a sensor based WCC O2 purge logic to which a voltage of a WCC O2 sensor is applied immediately after a fuel-cut; and when the sensor based WCC O2 purge logic is completed, applying an O2ucc learning history and an O2uccReset of an O2ucc (oxygen quantity adsorbed into UCC) for an under floor catalytic converter (UCC) and performing, by any one of a factor based UCC O2 purge logic to which an engine RPM and an Fpurge of a purge oxygen suction quantity [mg] are applied and a sensor based UCC O2 purge logic to which a voltage value of an UCC O2 rear sensor is applied, an UCC O2 purge of the UCC.

8 Claims, 6 Drawing Sheets

| SUCTION AIR QUANTITY [mg/stk] \ RPM | 1000 | 2000 | 3000 | 4000 |
|---|---|---|---|---|
| 100 | 0.95 | 0.95 | 0.9 | 0.8 |
| 200 | 0.90 | 0.90 | 0.85 | 0.8 |
| 300 | 0.90 | 0.90 | 0.85 | 0.80 |
| 500 | 0.85 | 0.85 | 0.80 | 0.80 |
| 800 | 0.80 | 0.80 | 0.80 | 0.80 |

UCC O2 PURGE FACTOR SETTING TABLE

FIG.3B

| DIVISION | CONTENTS |
|---|---|
| $O2_{UCC}$ | OXYGEN QUANTITY ADSORBED INTO UCC |
| $P\_O2_{UCC}\_d$ | UCC OXYGEN PURGE DETERMINATION VALUE |
| $P\_O2_{UCC}\_a$ | UCC OXYGEN PURGE QUANTITY |
| $P\_V_{UCC}$ | UCC O2 PURGE ENDING CONDITION VOLTAGE |
| $V_{UCC}$ | UCC OXYGEN SENSOR VOLTAGE |
| $F_{Purge}$ | FACTOR: UCC OXYTEN PURGE FACTOR |

FIG.4

O2 PURGE CONTROL METHOD AND VEHICLE EXHAUST SYSTEM FOR TWO TYPE CATALYSTS

CROSS-REFERENCE(S) TO RELATED APPLICATION

The present application claims priority to Korean Patent Application No. 10-2013-0121150, filed on Oct. 11, 2013, which is incorporated herein by reference in its entirety.

BACKGROUND OF THE INVENTION

1. Field of the Invention

Exemplary embodiments of the present invention relate to an O2 purge control method and an exhaust system for two type catalysts composed of WCC and UCCfh, and more particularly, to an O2 purge control method and an exhaust system for two type catalysts having catalysts arranged in two rows which may greatly improve reduction efficiency of catalytic oxidation atmosphere so as to remove NOx by increasing an O2 purge quantity immediately after a fuel-cut and prevent a generation of emissions such as CO and HC of the UCC arranged after the WCC.

2. Description of Related Art

Generally, it is very important to reduce NOx and CH/HC due to environment regulation for exhaust gas. To this end, a catalyst is used in an exhaust system of a gasoline vehicle to reduce NOx and CO/HC.

As the example, a warm up catalytic converter (hereinafter, referred to as WCC) and a under floor catalytic converter (hereinafter, referred to as UCC) may be installed before and after an exhaust pipe.

Generally, the removal efficiency of NOx and CO/HC of the WCC or the UCC cannot but be affected by catalytic oxidation atmosphere due to oxygen (hereinafter, referred to as O2).

For example, the removal efficiency of NOx is highest in an acceleration section by activating the temperature of the WCC or the UCC, but when O2 remains in the WCC or the UC, a part of emitted NOx may be emitted without being purified. As such, the O2 is the largest cause of reduction in performance efficiency of the WCC or the UCC.

In particular, the catalytic oxidation atmosphere of the WCC and the UCC cannot but be most severe immediately after a fuel-cut ends due to the O2. The reason is that the NOx is emitted by engine combustion after the fuel-cut ends or the engine combustion is not made at the time of the fuel-cut and thus the O2 is completely stored in the WCC and the UCC. As the result, the catalytic oxidation atmosphere of the WCC and the UCC is most severe due to the O2 and therefore the purification of NOx cannot but start after a predetermined time elapses.

The fuel-cut is a method for reducing fuel consumption due to the stopping of fuel injection when deceleration happens during driving and is referred to as a fuel cut-off.

Therefore, the O2 converts the WCC or the UCC into the catalytic oxidation atmosphere and therefore cannot but be the largest cause of reduction in the removal efficiency of NOx and CO/HC.

As the method for removing the above problems, an O2 purge is used. In this case, the O2 purge is performed to remove the O2 based on a detection of an O2 sensor and thus may previously prevent the O2 from being excessively stored in the WCC or the UCC or the catalytic oxidation atmosphere from being formed in the WCC or the UCC.

Generally, an execution condition of the O2 purge uses a method based on a detection value of the O2 sensor which is installed before and after the WCC or an oxygen storage capacity (OSC) modeling based method.

Therefore, the exhaust system in which the WCC and the UCC are sequentially arranged performs the WCC O2 purge and the UCC O2 purge based on an oxygen storage capacity (OSC) modeling prediction value along with the detection value of the O2 sensor to again reduce the catalytic oxidation atmosphere of the WCC and the UCC which is most severely affected by the O2 at the time of the fuel-cut, such that the WCC and the UCC may remove the NOx emitted due to the combustion immediately after the fuel-cut ends.

However, a method for modeling an OSC quantity of the UCC by the UCC O2 purge is very difficult to accurately predict the OSC quantity and may not avoid the occurrence of a difference deviation in an OSC deactivation level during a mileage progress of a vehicle and in particular, may have a very difficulty in real application by not performing a periodic feedback.

To solve the above problem, the O2 sensor is applied to the UCC like the WCC and therefore the UCC O2 purge may be determined as a voltage value of the O2 sensor. However, when the UCC O2 purge starts and ends as the voltage value of the O2 sensor like the WCC O2 purge, the UCC like the WCC cannot but perform rich combustion until the O2 purge is completed and thus the generation of emissions such as CO and HC cannot but be increased instantly.

In particular, in the exhaust system layout in which the UCC is arranged after the WCC, the emissions such as CO and HC generated in the WCC are introduced into the UCC and may be removed by the UCC, but the emissions such as CO and HC generated in the UCC are not removed by the UCC and therefore cannot but be completely emitted to the air.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an O2 purge control method and an exhaust system for two type catalysts having catalysts arranged in two rows which may greatly improve reduction efficiency of catalytic oxidation atmosphere so as to remove NOx by increasing an O2 purge quantity immediately after a fuel-cut and in particular, prevent a generation of emissions such as CO and HC due to rich combustion at the time of performing a UCC O2 purge based on a voltage value of an O2 sensor, by applying an engine revolutions per minute (RPM) and a Fpurge (factor) of a purge oxygen suction quantity [mg] after a WCC O2 purge of a warm up catalytic converter (WCC) is completed immediately after the fuel-cut.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, an O2 purge control method for two type catalysts, may include performing, by a WCC O2 purge of a warm up catalytic converter (WCC), a sensor based WCC O2 purge logic to which a voltage of a WCC O2 sensor is applied after a fuel-cut, and when the sensor based WCC O2 purge logic is completed, applying an O2ucc learning history and an O2uccReset of an oxygen quantity (O2ucc) adsorbed into an under floor catalytic converter (UCC) for the UCC and performing, by any one of a factor based UCC O2 purge logic to which an engine RPM and an Fpurge of a purge oxygen suction quantity are applied and a sensor based UCC O2 purge logic to which a voltage value of an UCC O2 rear sensor is applied, an UCC O2 purge of the UCC.

When the O2ucc learning history is not executed or even though the O2ucc learning history is executed, the O2uccReset is not executed, the sensor based UCC O2 purge logic is selected and performed, and when the O2ucc learning history is executed and the O2uccReset is executed, the factor based UCC O2 purge logic is selected and performed.

A check on whether the O2uccReset is executed is performed when the O2ucc learning history is executed.

The factor based UCC O2 purge logic performs (a) a first condition step of performing a check on whether the factor based UCC O2 purge logic is in an idle state, (b) a second condition step of performing a check on a voltage value for purge execution (Vucc) and a voltage value for purge ending (P_Vucc) of an UCC O2 sensor, and (c) when the Vucc is greater than the P_Vucc, a factor based UCC O2 purge step of applying the Fpurge and thus performing the UCC O2 purge of the UCC meeting the engine RPM and the purge oxygen suction amount.

In the first condition step, when it is determined that factor based UCC O2 purge logic is in the idle state, (a-1) a third condition step of checking the Vucc of the UCC O2 sensor and the P_Vucc is performed, and (d) when it is determined that the Vucc is greater than the P_Vucc, it is determined that the factor based UCC O2 purge logic is feedback and when it is determined that the Vucc is equal to or less than the P_Vucc, the sensor based UCC O2 purge logic is performed, and thereby a sensor based UCC O2 purge step is executed.

When the sensor based UCC O2 purge step ends, an oxygen storage capacity (OSC) quantity of the UCC is determined as an actual OSC quantity and thus compares accuracy with a modeling OSC quantity and the O2ucc of the UCC is determined and thus is defined as the O2ucc learning history.

In the second condition step, when it is determined that the Vucc of the UCC O2 sensor is greater than the P_Vucc, (b-1) the factor based UCC O2 purge logic ends and enters a standby mode after the O2uccReset is performed.

In the factor based UCC O2 purge step, (c-1) oxygen purge determination quantity (P_O2ucc) which is equal to the O2ucc adsorbed into the UCC multiplied by the Fpurge is determined and the P_O2ucc is substituted into UCC oxygen purge determination quantity (P_O2ucc_d), (c-2) UCC oxygen purge quantity (P_O2ucc_a) is greater than the P_O2ucc_d is determined, (c-3) when it is determined that the P_O2ucc_a is greater than the P_O2ucc_d, the factor based UCC O2 purge logic is performed, while when it is determined that the P_O2ucc_a is equal to or less than the P_O2ucc_d, the factor based UCC O2 purge logic ends.

The sensor based UCC O2 purge logic is continued until the Vucc is greater than the P_Vucc and when it is determined that the Vucc is greater than the P_Vucc, the OSC quantity of the UCC is determined as the actual OSC quantity and thus compares accuracy with the modeling OSC quantity and the O2ucc of the UCC is determined and thus is defined as the O2ucc learning history.

In another aspect of the present invention, a vehicle exhaust system using an O2 purge for two type catalysts, may include an exhaust line configured to emit exhaust gas emitted from an engine to the air, a warm up catalytic converter (WCC) configured to be equipped in the exhaust line to purify NOx, an under floor catalytic converter (UCC) configured to be equipped in the exhaust line in back of the WCC, a WCC front O2 sensor configured to be equipped in the exhaust line in front of the WCC, a WCC rear O2 sensor configured to be equipped in the exhaust line in back of the WCC, and an UCC rear O2 sensor configured to be equipped in the exhaust line in back of the UCC.

The UCC rear O2 sensor detects an O2 concentration of the UCC, to which an UCC O2 purge of the UCC is applied, as a voltage value.

The engine is a gasoline engine.

In further another aspect of the present invention, a vehicle exhaust system using an O2 purge for two type catalysts and performed by the O2 purge control method, may include an exhaust line configured to emit exhaust gas emitted from an engine to the air, the WCC configured to be equipped in the exhaust line to purify NOx, the UCC configured to be equipped in the exhaust line in back of the WCC, the WCC O2 sensor including a WCC front O2 sensor configured to be equipped in the exhaust line in front of the WCC and outputting an O2 concentration as a voltage value, a WCC rear O2 sensor configured to be equipped in the exhaust line in back of the WCC and outputting an O2 concentration as a voltage value, and the UCC rear O2 sensor configured to be equipped in the exhaust line in back of the UCC outputting an O2 concentration of the UCC, as a voltage value.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF SPECIFIC EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
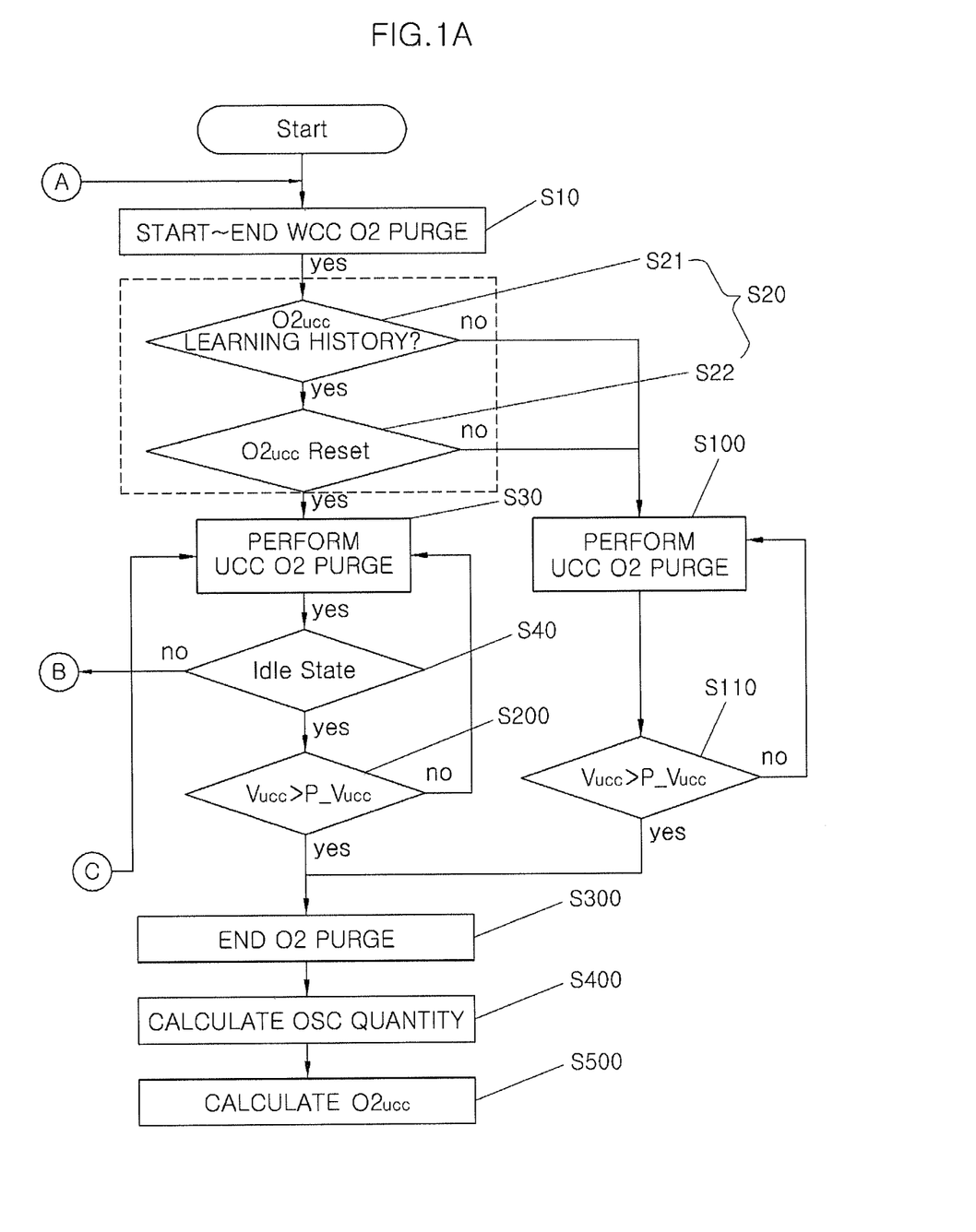
FIGS. 1A and 1B are an O2 purge control flow chart performed immediately after a fuel-cut in an exhaust system of a gasoline vehicle to which a WCC and an UCC and three O2 sensors in accordance with an exemplary embodiment of the present invention are applied.
Figure 1B:
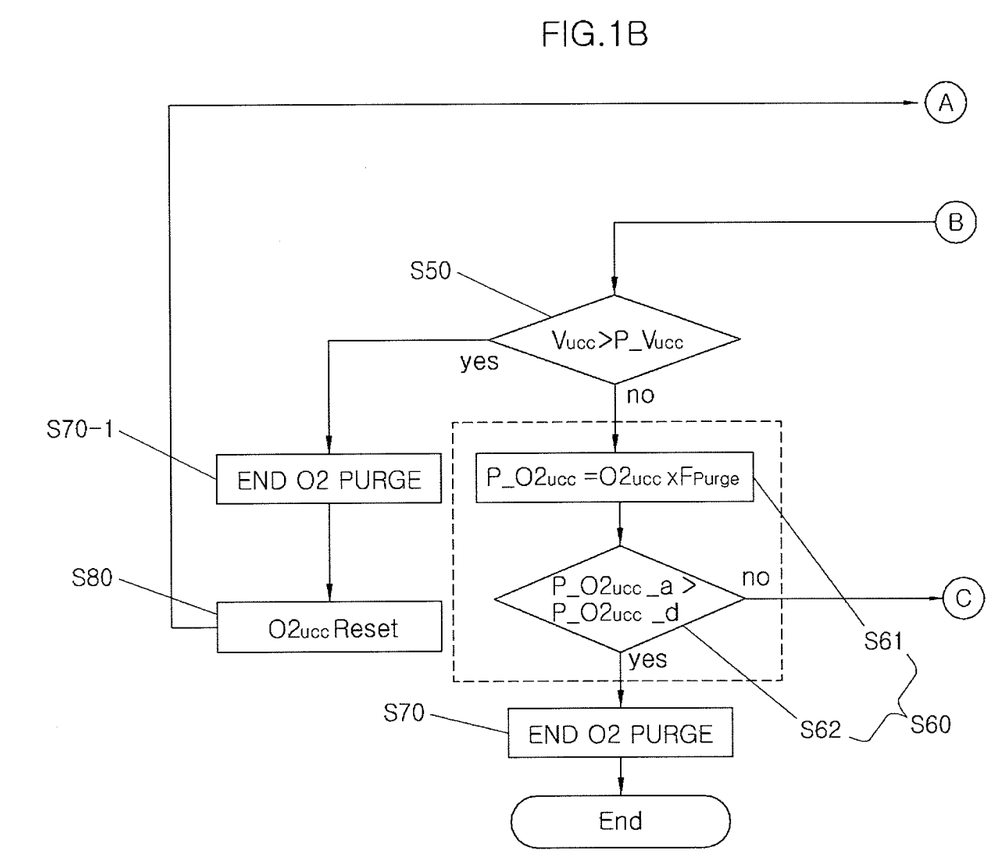

FIGS. 1A and 1B are illustrates an O2 purge control flow chart performed immediately after a fuel-cut in an exhaust system of a gasoline vehicle to which a WCC and an UCC and three O2 sensors in accordance with an exemplary embodiment of the present invention are applied.

As illustrated in FIGS. 1A and 1B, an O2 purge method for two types catalysts immediately after a fuel-cut includes a WCC O2 purge performed in S10, a factor based UCC O2 purge logic performed in S30 under a condition of S20, and a sensor based UCC O2 purge logic performed in S100.

The sensor based UCC O2 purge logic means that an oxygen storage capacity of the UCC may predict an oxygen quantity adsorbed into the UCC based on OSC modeling, while the factor based UCC O2 purge logic means that the oxygen quantity adsorbed into the UCC may not be predicted based on the OSC modeling.

Therefore, the WCC O2 purge logic and the sensor based UCC O2 purge logic are based on an O2 purge method using a detection value of the O2 sensor, while the factor based UCC O2 purge logic is a method for using Fpurge [UCC O2 factor] which is smaller than 1.

Figure 2:
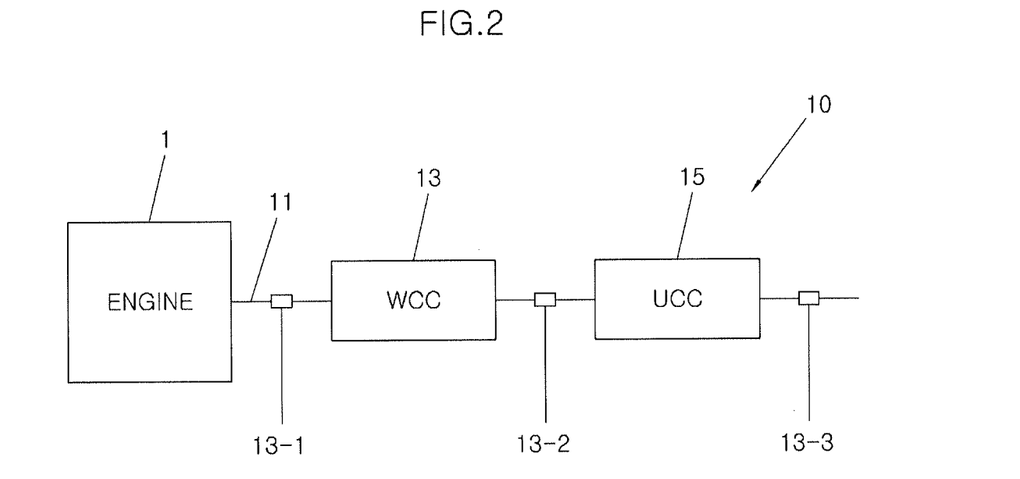
FIG. 2 is a block configuration diagram of the exhaust system of the gasoline vehicle illustrated in FIG. 1.

Meanwhile, FIG. 2 illustrates a configuration of an exhaust system of a vehicle in which the WCC O2 purge logic, the sensor based UCC O2 purge logic, and the factor based UCC O2 purge logic are performed.

As illustrated in FIG. 2, in the exhaust system 10 of the vehicle, an exhaust line 11 is connected to an engine 1 to emit exhaust gas to the air, a WCC 13 is equipped in the exhaust line 11 along with an UCC 15 disposed after the WCC 13, a WCC front O2 sensor 13-1 is disposed in front of the WCC 13, a WCC rear O2 sensor 13-2 is disposed in back of the WCC 13 between the WCC 13 and the UCC 15, and an UCC rear O2 sensor 13-3 is disposed in back of the UCC 15.

The WCC 13 is a warm up catalytic converter and the UCC 15 is an under floor catalytic converter.

The WCC front O2 sensor 13-1, the WCC rear O2 sensor 13-2, and the UCC rear O2 sensor 13-3 output an O2 concentration between thinness and thickness as a value of 0V to 1 V. For example, a binary type O2 sensor outputs 0V when the O2 concentration is thin, while outputs 1V when the O2 concentration is thick, such that a starting time and an ending time of the WCC O2 purge are determined.

In the WCC O2 purge of the WCC 13, outputs of the WCC front O2 sensor 13-1 and the WCC rear O2 sensor 13-2 are used. For example, the starting time of the WCC O2 purge=0V and the ending time of the WCC O2=1V are applied.

In the UCC O2 purge of the UCC 15, an output of the UCC rear O2 sensor 13-3 is used. However, the sensor based UCC O2 purge logic applies the ending time having a value smaller than 1V and the factor based UCC O2 purge logic applies Fpurge [UCC O2 factor]<1, and thus when Fpurge=1, may be converted into the O2 sensor based purge logic.

Referring back to FIGS. 1A and 1B, S10 is a process of performing the WCC O2 purge and in this process, the O2 purge starts from the value smaller than 1V of the WCC front O2 sensor 13-1 and then ends at 1V. Therefore, the WCC O2 purge is the same as a general purge method.

When the WCC O2 purge of S10 ends, the execution method of the UCC O2 purge is defined as in S20.

This is determined as an O2ucc learning history of S21 and an O2ucc Reset of S22. In this case, the O2ucc means an oxygen quantity adsorbed into the UCC and the O2ucc learning history means the case in which the UCC O2 purge logic is performed as the factor based UCC O2 purge logic at least once. That is, as in S500, this means a state in which the UCC O2 purge is performed and then the calculation of the O2ucc is performed.

Therefore, when in a check of S21, the O2ucc learning history is not present or even though the O2ucc learning history is present, the O2ucc Reset is not performed in a check of S22, the process proceeds to S100, such that the sensor based UCC O2 purge logic using the detection value of the UCC rear O2 sensor 13-3 is performed. The process of S100 will be described below in detail.

On the other hand, when the O2ucc learning history is present in a check of S21 and the O2ucc Reset is performed in a check of S22, the process proceeds to S30 and thus the factor based UCC O2 purge logic is performed.

When the factor based UCC O2 purge logic of S30 is performed, as in S40, it is checked whether it is in an idle state. The check of the idle may be measured by allowing the oxygen storage capacity (OSC) of the USC to use a temperature of an OSC model, a temperature of cooling water, a vehicle velocity, and the like under the idle condition.

Therefore, if it is determined that the factor based UCC O2 purge logic is not in an idle state by a check of S40, the factor based UCC O2 purge logic is continuously applied. However, before the factor based UCC O2 purge logic is not completely applied, a check for the voltage value of the UCC O2 sensor 13-3 is first performed as in S50.

To this end, in S50, two voltages of the UCC rear O2 sensor 13-3 are checked. For example, Vucc and P_Vucc are checked and as the condition, Vucc>P_Vucc is applied. In this case, the Vucc is a voltage value for performing the purge of the UCC O2 sensor 13-3 and the P_Vucc is a voltage value for ending the purge of the UCC O2 sensor 13-3.

If it is determined in a check of S50 that Vucc>P_Vucc is satisfied, the process proceeds to S70-1 and thus the factor based UCC O2 purge logic ends and then the process feedbacks to S10 after the O2ucc Reset of S80 and thus again returns to an initial state of the O2 purge logic.

On the other hand, if it is determined in the check of S50 that Vucc>P_Vucc is not satisfied, the process proceeds to S60 and thus completely proceeds to the factor based UCC O2 purge logic.

In S61, an UCC oxygen purge determination quantity P_O2ucc is calculated by applying the Fpurge. To this end, the UCC oxygen purge determination quantity is calculated by applying P_O2ucc=O2ucc*Fpurge and replacing the P_O2ucc with P_O2ucc_d.

Figure 3A:
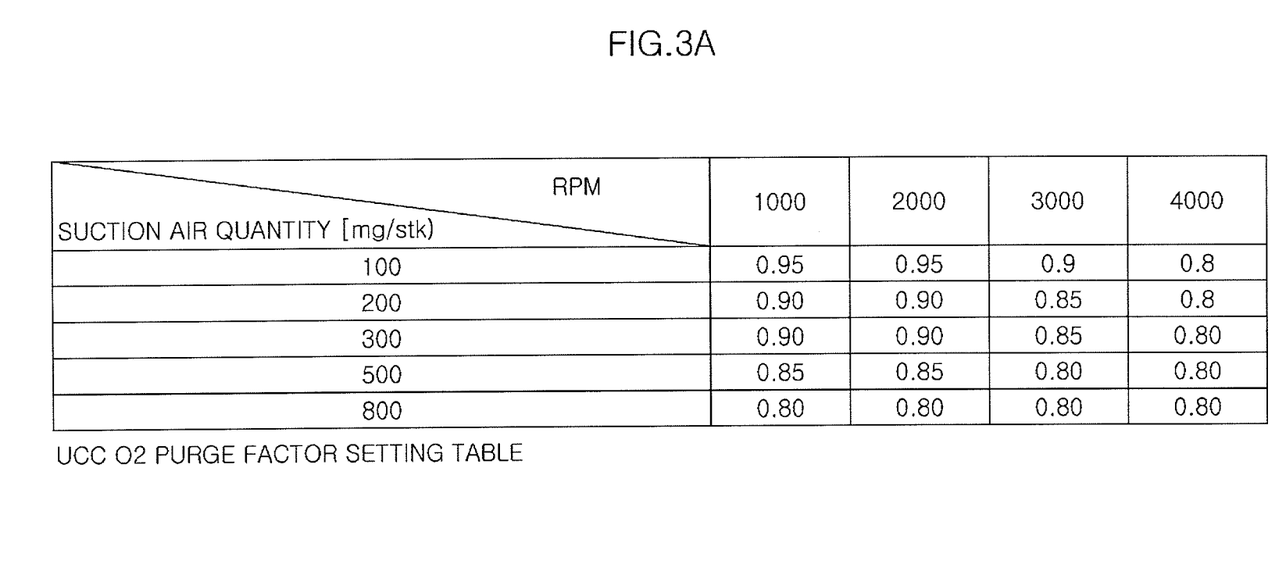
FIGS. 3A and 3B are a purge factor setting table at the time of controlling an O2 purge in accordance with an exemplary embodiment of the present invention.
Figure 3B:
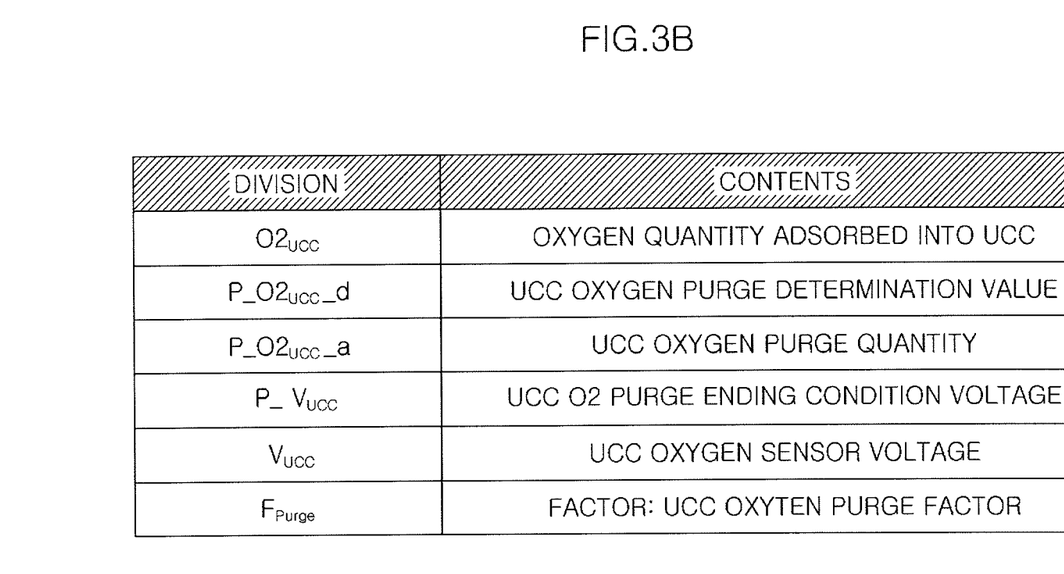

In this case, the applied Fpurge is divided into the engine RPM and the purge oxygen suction quantity [mg] as illustrated in FIG. 3A and the condition of Fpurge<1 like Fpurge=0.8 (minimal)~Fpurge=0.95 (maximal) is applied. Therefrom, it may be appreciated that Fpurge=1 is the sensor based UCC O2 purge logic. Further, FIG. 3B illustrates a definition of O2ucc, P_O2ucc_d, P_O2ucc_a, Vucc, P_Vucc, and Vucc, respectively. Therefore, the oxygen purge quantity of the UCC 15 input to an engine control unit (ECU) is oxygen suction quantity A×Fpurge and the UCC O2 purge may be progressed at a level at which the oxygen of oxygen suction quantity A×Fpurge quantity is purged.

Next, as in S62, an actual purge quantity is determined and thus it is determined whether the factor based UCC O2 purge ends. To this end, the condition of P_O2ucc_a>P_O2ucc_d is applied, P_O2ucc_a is the UCC oxygen purge quantity, and the P_O2ucc_d is the UCC oxygen purge determination quantity.

Therefore, if it is determined in a check of S62 that the condition of P_O2ucc_a>P_O2ucc_d is not satisfied, the process feedbacks to S40, and thus the factor based UCC O2 purge is continued, while if it is determined that the condition of $P_{13}O2ucc_{13}a$>P_O2ucc_d is satisfied, the process proceeds to S70 and thus the factor based UCC O2 purge ends. Next, the O2 purge logic completely ends and then is converted into a standby mode.

Meanwhile, S100 is the sensor based UCC O2 purge logic, which corresponds to a case in which as the sensor based UCC O2 purge logic, the O2ucc learning history is not present in the check of S21 and even though the O2ucc learning history is present, the O2ucc Reset is not performed in the check of S22.

Therefore, in the sensor based UCC O2 purge of S100, the two voltages of the UCC rear O2 sensor 13-3 are checked. For example, the Vucc and the P_Vucc are checked and as the condition, the Vucc>P_Vucc is applied. In this case, the Vucc is the voltage value for performing the purge of the UCC O2 sensor 13-3 and the P_Vucc is the voltage value for ending the purge of the UCC O2 sensor 13-3.

Therefore, if it is determined in the check of S110 that Vucc>P_Vucc is not satisfied, the sensor based UCC O2 purge of S100 is continued, while it is determined that Vucc>P_Vucc is satisfied, as in S300, the sensor based UCC O2 purge ends.

Meanwhile, S200 is a process of determining once more whether the factor based UCC O2 purge logic is applied by determining the factor based UCC O2 purge logic to be idle in the check of S40.

To this end, in S200, the two voltages of the UCC rear O2 sensor 13-3 are checked. For example, the Vucc and the P_Vucc are checked and as the condition, Vucc>P_Vucc is applied. In this case, the Vucc is the voltage value for performing the purge of the UCC O2 sensor 13-3 and the P_Vucc is the voltage value for ending the purge of the UCC O2 sensor 13-3.

If it is determined in the check of S200 that Vucc>P_Vucc is not satisfied, the process proceeds to S30 and thus completely proceeds to the factor based UCC O2 purge logic.

On the other hand, if it is determined in the check of S200 that Vucc>P_Vucc is satisfied, the process proceeds to S300 and thus the sensor based UCC O2 purge is progressed. In particular, even when the purge is progressed up to a threshold of the detection value (voltage) of the UCC O2 sensor in the idle section, the emissions of CO and HC is insignificant as compared with other regions. Therefore, the OSC may be measured based on the temperature of cooling water, the vehicle velocity, and the temperature of the UCC model while the O2 purge is completed with the detection value of the UCC rear O2 sensor 13-3 in the idle.

Next, the sensor based UCC O2 purge by S200 ends as in S300.

Meanwhile, when the sensor based UCC O2 purge of S300 ends, the OSC quantity of the UCC 15 which suffers from the factor based UCC O2 purge or the sensor based UCC O2 purge as in S400 is calculated.

The OSC quantity calculated in S400 is converted into the actual OSC quantity and the monitoring and learning thereof are continuously performed, which is applied to the determination on the accuracy of the OSC measurement quantity.

For example, when the modeling OSC quantity>actual OSC quantity, the UCC O2 sensor detection value (voltage) is equal to or more than a threshold, and therefore the purge needs to be continuously performed to prevent the emissions such as CO and HC from being generated while the purge ends or is progressed.

On the other hand, when the modeling OSC quantity<actual OSC quantity, the purge quantity is insufficient and thus the detection value of the UCC rear O2 sensor 13-3 is not changed, such that the OSC quantity of the UCC 15 may not be checked.

Next, S500 is a process of calculating the O2ucc and the learning of the UCC adsorption oxygen quantity of the UCC 15 suffering from the purge may be performed. Therefore, the O2ucc of S500 is applied to the check of the O2ucc learning history of S21.

Figure 4:
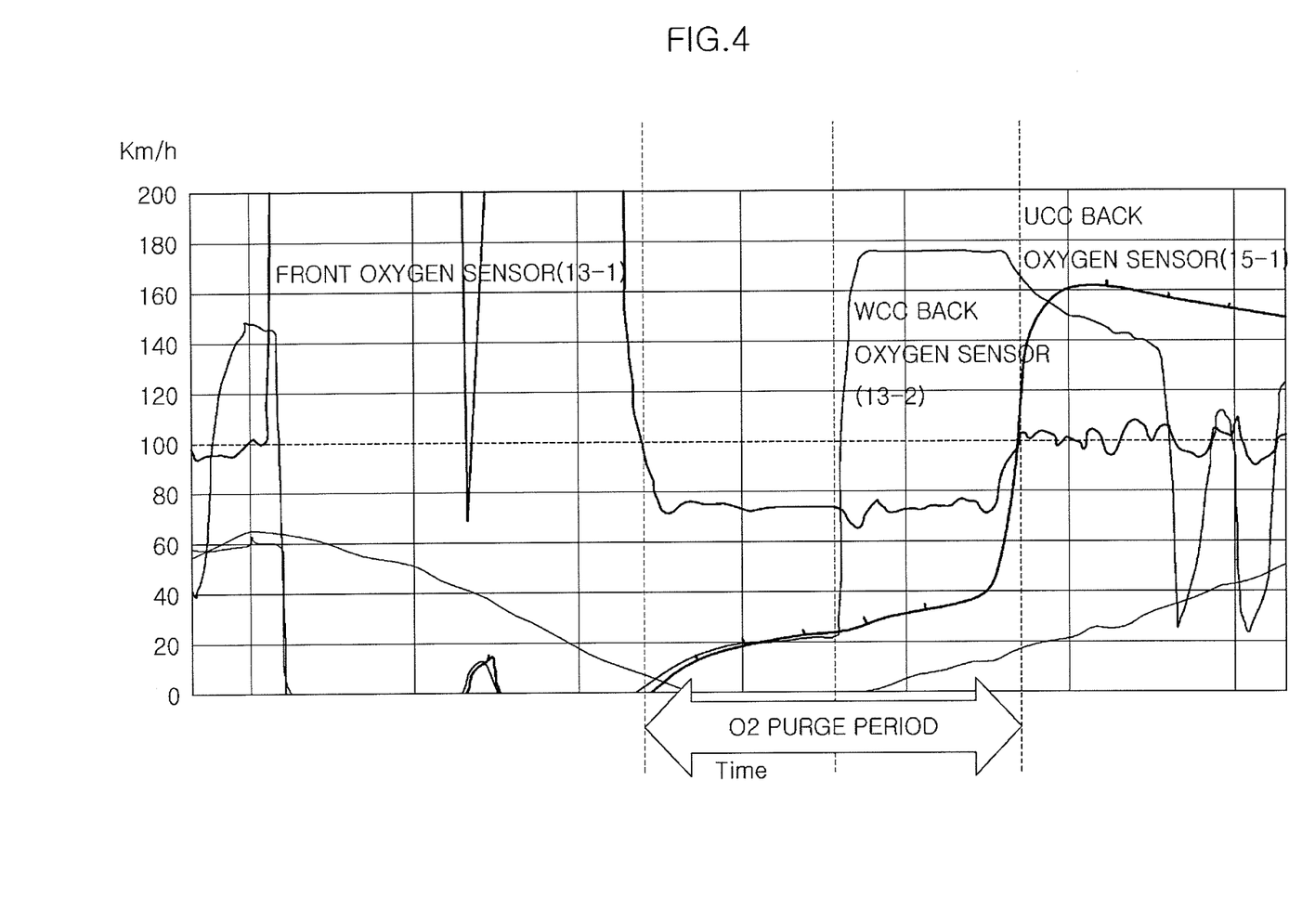
FIG. 4 is a diagram illustrating an example in which a purge period of the O2 purge control in accordance with the exemplary embodiment of the present invention is relatively more extended than that of a WCC O2 purge or a WCC+UCC O2 purge.

Meanwhile, FIG. 4 is an example of a purge diagram illustrated after the O2 purge in accordance with the exemplary embodiment of the present invention.

As illustrated in FIG. 4, the sensor based WCC O2 purge, the sensor based UCC O2 purge, and the factor based UCC O2 purge have a relatively longer purge period than that of the WCC O2 purge or the WCC+UCC O2 purge. In particular, the purge period is increased with the increase in the UCC O2 purge period and thus it is verified as the experiment result that the reduction efficiency of the catalytic oxidation atmosphere for removing NOx is greatly improved due to the increase in the O2 purge quantity immediately after the fuel-cut, and in particular, the generation of the emissions such as CO and HC due to the rich consumption at the time of the UCC O2 purge based on the voltage value of the O2 sensor is prevented.

As described above, the O2 purge method for two type catalysts in accordance with the exemplary embodiment of the present invention performs the sensor based WCC O2 purge logic, to which the voltage of the WCC O2 sensor is applied, on the WCC O2 purge of the warm up catalytic converter (WCC) immediately after the fuel-cut, when the sensor based WCC O2 purge logic is completed, applies the O2ucc learning history and the O2uccReset of the O2ucc (oxygen quantity adsorbed into the UCC) for the UCC, and performs, by any one of the factor based UCC O2 purge logic to which the engine RPM and the Fpurge of the purge oxygen suction quantity [mg] are applied and the sensor based UCC O2 purge logic to which the voltage value of the UCC O2 rear sensor is applied, the UCC O2 purge of the UCC, thereby greatly improving the reduction efficiency of the catalytic oxidation atmosphere for removing NOx with the increase in the O2 purge quantity immediately after the fuel-cut, in particular, prevent the generation of the emissions such CO and HC due to the rich combustion at the time of the UCC O2 purge based on the voltage value of the OS sensor.

In accordance with the exemplary embodiments of the present invention, the WCC and the UCC arranged after the WCC are applied with the engine RPM and the Fpurge (factor) of the oxygen suction quantity [mg] to extend the purge period of the UCC performed immediately after the fuel-cut, thereby largely improving the UCC O2 purge performance, and in particular, the O2 purge quantity is increased immediately after the fuel-cut, thereby largely improving the reduction efficiency of the catalytic oxidation atmosphere for removing NOx.

Further, in accordance with the exemplary embodiments of the present invention, the WCC and the UCC arranged after the WCC perform the factor based UCC O2 purge to which the engine RPM and the Fpurge (factor) of the purge oxygen suction quantity [mg] are applied along with the UCC O2 purge based on the voltage value of the O2 sensor, thereby performing the UCC O2 purge without the OSC quantity modeling based O2 purge of the UCC having difficulties such as the prediction accuracy of the OSC quantity at the time of the UCC O2 purge, the difference deviation in the OSC deactivation level, and no periodic feedback.

In addition, in accordance with the exemplary embodiments of the present invention, it is possible to prevent the emissions such as CO and HC which are generated due to the rich combustion from being generated in the UCC using the factor based UCC O2 purge to which the engine RPM and the Fpurge (factor) of the purge oxygen suction quantity [mg] are applied.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An O2 purge control method for two type catalysts using a controller, comprising:

performing, by a WCC O2 purge of a warm up catalytic converter (WCC), a sensor based WCC O2 purge logic to which a voltage of a WCC O2 sensor is applied after a fuel-cut; and when the sensor based WCC O2 purge logic is completed, applying by the controller, an O2ucc learning history and an O2uccReset of an oxygen quantity (O2ucc) adsorbed into an under floor catalytic converter (UCC) for the UCC and performing, by one of a factor based UCC O2 purge logic to which an engine RPM and an Fpurge of a purge oxygen suction quantity are applied and a sensor based UCC O2 purge logic to which a voltage value of an UCC O2 rear sensor is applied, an UCC O2 purge of the UCC, wherein the O2ucc learning history is a case in which an UCC O2 purge logic is performed as the factor based UCC O2 purge logic at least once, and the Fpurge is a UCC O2 factor which is less than 1, wherein when the O2ucc learning history is not executed or even though the O2ucc learning history is executed, the O2uccReset is not executed, the sensor based UCC O2 purge logic is selected and performed, and when the O2ucc learning history is executed and the O2uccReset is executed, the factor based UCC O2 purge logic is selected and performed, wherein the factor based UCC O2 purge logic is progressed at a level at which oxygen purge quantity is an amount of oxygen suction quantity A×the Fpurge, and wherein the Fpurge is divided into the engine RPM and the purge oxygen suction quantity and defines a correlation between the engine RPM and the purge oxygen suction quantity.

2. The O2 purge control method for the two type catalysts of claim 1, wherein a check on whether the O2uccReset is executed is performed when the O2ucc learning history is executed.

3. The O2 purge control method for the two type catalysts of claim 1, wherein the factor based UCC O2 purge logic performs:

(a) a first condition step of performing a check on whether the factor based UCC O2 purge logic is in an idle state;

(b) a second condition step of performing a check on a voltage value for purge execution (Vucc) and a voltage value for purge ending (P_Vucc) of an UCC O2 sensor; and (c) when the Vucc is greater than the P_Vucc, a factor based UCC O2 purge step of applying the Fpurge and thus performing the UCC O2 purge of the UCC meeting the engine RPM and the purge oxygen suction amount.

4. The O2 purge control method for the two type catalysts of claim 3, wherein in the first condition step, when it is determined that factor based UCC O2 purge logic is in the idle state, (a-1) a third condition step of checking the Vucc of the UCC O2 sensor and the P_Vucc is performed; and (d) when it is determined that the Vucc is greater than the P_Vucc, it is determined that the factor based UCC O2 purge logic is feedback and when it is determined that the Vucc is equal to or less than the P_Vucc, the sensor based UCC O2 purge logic is performed, and thereby a sensor based UCC O2 purge step is executed.

5. The O2 purge control method for the two type catalysts of claim 4, wherein when the sensor based UCC O2 purge step ends, an oxygen storage capacity (OSC) quantity of the UCC is determined as an actual OSC quantity and thus compares accuracy with a modeling OSC quantity and the O2ucc of the UCC is determined and thus is defined as the O2ucc learning history.

6. The O2 purge control method for the two type catalysts of claim 3, wherein in the second condition step, when it is determined that the Vucc of the UCC O2 sensor is greater than the P_Vucc, (b-1) the factor based UCC O2 purge logic ends and enters a standby mode after the O2uccReset is performed.

7. The O2 purge control method for the two type catalysts of claim 3, wherein in the factor based UCC O2 purge step, (c-1) oxygen purge determination quantity (P_O2ucc) which is equal to the O2ucc adsorbed into the UCC multiplied by the Fpurge is determined and the P_O2ucc is substituted into UCC oxygen purge determination quantity (P_O2ucc_d);

(c-2) UCC oxygen purge quantity (P_O2ucc_a) is greater than the P_O2ucc_d is determined;

(c-3) when it is determined that the P_O2ucc_a is greater than the P_O2ucc_d, the factor based UCC O2 purge logic is performed, while when it is determined that the P_O2ucc_a is equal to or less than the P_O2ucc_d, the factor based UCC O2 purge logic ends.

8. The O2 purge control method for the two type catalysts of claim 1, wherein the sensor based UCC O2 purge logic is continued until the Vucc is greater than the P_Vucc and when it is determined that the Vucc is greater than the P_Vucc, the OSC quantity of the UCC is determined as the actual OSC quantity and thus compares accuracy with the modeling OSC quantity and the O2ucc of the UCC is determined and thus is defined as the O2ucc learning history.

* * * * *